Dec. 8, 1970 F. P. ELLIOTT Re. 26,999
CONTROL SYSTEM FOR TERMINATING THE DISCHARGE THROUGH A FLASH LAMP
Original Filed May 4, 1965
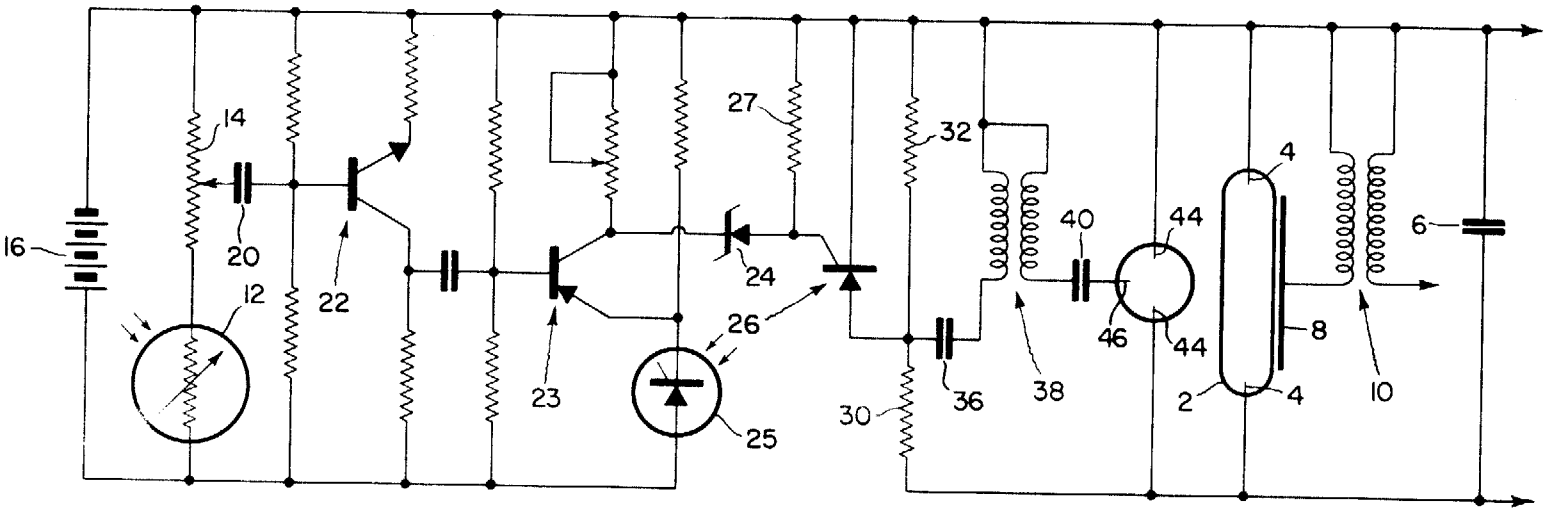
INVENTOR.
FRANKLIN P. ELLIOTT
BY Arthur H. Swanson
ATTORNEY.

United States Patent Office

Re. 26,999
Reissued Dec. 8, 1970

26,999

CONTROL SYSTEM FOR TERMINATING THE DISCHARGE THROUGH A FLASH LAMP

Franklin P. Elliott, Denver, Colo., assignor to Honeywell Inc., Minneapolis, Minn., a corporation of Delaware Original No. 3,340,426, dated Sept. 5, 1967, Ser. No. 453,080, May 4, 1965. Application for reissue July 22, 1969, Ser. No. 847,476
Int. Cl. G01j *1/28;* H01j *39/12;* H05b *41/38*
U.S. Cl. 315—151 8 Claims

Matter enclosed in heavy brackets [ ] appears in the original patent but forms no part of this reissue specification; matter printed in italics indicates the additions made by reissue.

*ABSTRACT OF THE DISCLOSURE*

*A photocell, arranged to receive light reflected from an object to be photographed which is illuminated by a pulse of light from a flash tube, is connected to a silicon controlled rectifier and turns on the latter when the photocell has received a predetermined quantity of light. The turning on of the rectifier triggers a quench tube to terminate the light pulse prior to the expiration of its normal duration. A transistor connected to the photocell prevents it from turning on the rectifier unless a light activated silicon controlled rectifier has been made conductive by receiving light from the flash tube.*

This invention relates to electronic apparatus, and more particularly, to electronic photoflash apparatus.

In the art of photography, cameras and the like have been provided with some form of an automatic exposure control means. These means, however, respond only to light which has a persistency which is long compared to the shortest shutter speed available on the camera. The light may be natural or artificial. One form of artificial light which has come into wide use is the so-called electronic flash device. In such devices, a relatively high voltage charge is stored on a capacitor. Then, at the instant of the taking of a picture, that capacitor is discharged through a gas filled flash tube to provide the desired light. subsequent to the taking of the picture, a new charge is established and stored on the capacitor in readiness for the next flash discharge through the flash tube. The light flashes produced in such apparatus are normally of extremely short duration, on the order of a millisecond. The automatic exposure control devices heretofore provide for cameras and the like have operated to control either the lens diaphragm opening or the shutter speed or both. When the long persistent light is used, the controlled mechanism sets the desired condition into the camera prior to or during the actual taking of the picture. Such electrical-mechanical systems obviously would not be able to respond fast enough to control the amount of light falling on the film when an electronic flash device is used as the principle light source. Such flash light sources ordinarily produce repeated flashes of light, each with the same light energy content. With such electronic flash light sources, the light falling on the film is controlled by adjusting the camera lens diaphragm. Such an arrangement does not lend itself well to instantaneous automatic exposure control.

It is accordingly an object of the present invention to provide an improved automatic flash exposure control apparatus.

It is a further object of the present invention to provide means for automatically controlling the light energy produced by the electronic flash light source.

It is another object of the present invention to provide a light controlled, electronic switch which is self-protected to eliminate false switching.

It is a further object of the present invention to provide an improved control for the light energy from a flash source which is adjustable to different light energy levels and which is activated into operation by the light from the flash source.

In accomplishing these and other objects, there has been provided, in accordance with the present invention, a control circuit for use with an otherwise conventional electronic photo flash apparatus. The control circuit includes a light controlled electronic switch means for extinguishing the flash in the flash tube prior to the normal termination of the flash. The light from the flash is directed toward an object to be illuminated, such as the subject of a photograph. Light reflected from the object falls upon a light sensitive element to produce an electrical signal corresponding to the light energy falling on the light sensitive element. The electrical signal is integrated during the interval of the flash and, when the integrated value of the electrical signal reaches a predetermined value, corresponding to the proper light exposure on the film, a control pulse is generated by a trigger circuit which, in turn, initiates a short circuit path around the flash tube, thereby extinguishing the flash substantially at the instant of the generation of the control pulse. A light sensitive gate circuit is provided to prevent extraneous signals from producing the control pulse. The gate circuit is actuated by the light from the flash tube to permit only desired signals from the light sensitive element to produce the control pulse.

A better understanding of this invention may be had from the following detailed description when read in connection with the accompanying single figure drawing, in which the single figure is a schematic circuit diagram of an electronic flash control system according to the present invention.

Referring now to the drawing in more detail there is shown a control circuit for controlling the flash duration of a light flash produced in an electronic photo flash mechanism. A flash tube 2 is provided with a pair of main current conducting electrodes 4. The electrodes 4 are connected, respectively, to opposite electrodes of a main storage capacitor 6. A trigger electrode 8 is positioned adjacent but external to the flash tube 2. The electrode 8 is connected through a trigger transformer 10 to a control switch (not shown) such as the switch associated with the shutter on photographic cameras. The elements thus far described are part of a conventional electronic photo flash apparatus which may, for example, be of the sort shown in the patent to R. D. Kluge No. 3,049,611. In the operation of such flash apparatus, a suitable electronic circuitry such as that shown in the Kluge patent establishes a relatively high voltage charge across the storage capacitor 6. The stored voltage also appears across the electrodes 4—4 of the flash tube 2. When it is desired to produce a flash of light from the tube 2, a triggering pulse is produced through the transformer 10 and applied to the trigger electrode 8. That pulse initiates a flash discharge between the electrodes 4 of the tube 2. Under normal operations heretofore, the flash continues until the capacitor 6 has discharged through the tube 2 to the point where the voltage will no longer support the flash across the tube 2. That usually requires about one millisecond of time. According to the present invention the maximum time duration of the flash produced across the tube 2 remains at that time determined by the discharge of the capacitor 6 through the tube 2. However, in order to automatically adjust the flash for those instances wherein the object requires less than the maximum amount of light, a control circuit is provided for extinguishing the flash at some desired point short of the maximum time duration.

In accomplishing the desired quenching of the flash tube, advantage is taken of a characteristic of certain light sensitive semi-conductor elements. Light sensitive semi-conductor elements such as cadmium-sulfide exhibit a unique response characteristic in that the carriers in the semi-conductor elements which provide electrical conductivity are created extremely fast by exposures to light photons. Additional carriers are created as the element is exposed to a continuing light exposure, providing an integral measure of the total light exposure over short enough times. Thus, the light sensitive semi-conductor elements respond very fast to incident light exposures, with the conductivity increasing in relation to the intensity of light falling on the element. However, with a sudden decrease in incident light, the conductivity of the semi-conductor material decreases slowly. In other words, the conductivity characteristics of these semi-conductor materials exhibit a fast reaction to light exposure and a slow decay time when the light is removed. With this characteristic, the light sensitive semi-conductor comprises, over relatively short intervals, a non-reactive light integrator.

This is in contradistinction to those circuits wherein the integration of the light-produced signal is accomplished by a capacitance integrating network, or the like, such as that shown in U.S. Patent No. 3,033,988 issued in the name of H. E. Edgerton. The integrator used in the present invention provides several distinct advantages over those shown in the prior art. For example, the capacitance type integrator requires that the dark impedance of the photocell be very high, otherwise the photocell impedance upsets the integration characteristics. In order to achieve the high photocell dark impedance with the required high light sensitivity, the light sensitive element must be a photomultiplier tube. Such tubes require a rather complex power supply. This results in a package which is sufficiently bulky as to preclude its use in portable, camera mounted flash equipment. The control system of the present invention, on the other hand, is of such simple and compact structure as to render it readily included in camera mounted equipment. An integrator employing a capacitor, but including a semi-conductor light sensitive element, cannot achieve proper integration without a cumbersome switching or shutter mechanism for turning the integration device on at the time of the flash. The present invention avoids the need for switches or shutters. It must be remembered, of course, that the term "fast reaction time and slow decay time" is relative. The reaction time and decay time are significant only as they are related to the maximum flash interval. It will be remembered that this flash interval is normally of the order of one millisecond. The significance of this relationship will appear hereinafter.

In this invention a photocell 12 having these characteristics is connected in a series circuit with a resistor such as a slidewire resistor 14 and a power supply such as a battery 16. The slider 18, which operates in conjunction with the slidewire resitsor 14, is connected through a capacitor 20 to the input circuit of a transistor amplifier including the transistors 22 and 23. The output of the amplifier from the collector at transistor 23 is connected to the input circuit of a signal level sensing device such as Zener diode 24. The return path for the emitter of transistor 23 is taken through a light controlled, or triggered, silicon controlled rectifier 25. The output of the Zener diode 24 is connected in triggering relationship to the control electrode of a silicon controlled rectifier 26 and through a resistor 27 to a negative line 28. The cathode of the silicon controlled rectifier 26, is, also connected to the negative lead 28. The anode of the rectifier 26 is connected to the junction between two serially connected resistors 30 and 32. The remote end of the resistor 32 is connected to the lead 28, while the remote end of the resistor 30 is connected to a positive lead 34, which carries the positive potential representative of the charge across the main storage capacitor 6. The junction between the resistors 30 and 32 is also connected through a capacitor 36 to the primary winding of a quench trigger transformer 38. The secondary winding of the trigger transformer 38 is connected through and isolating capacitor 40 to the trigger electrode of a specially designed quench or switch tube 42. The main conductive path of the quench tube 42 is connected in shunt with the main conductive path of the flash tube 2.

There are, of course, certain criteria that must be met in the quench tube 42. To operate effectively, the quench tube 42 must have a relatively low impedance compared with the main flash tube 2. A main flash tube has a minimum impedance of typically 1.5 to 2 ohms. Thus, the quench tube should have an impedance near 0.1 ohm. To provide such a low impedance, the tube should have a low gas pressure and a short electrode spacing. The electrodes must be capable of carrying a very high current for a short time. The tube must be capable of being triggered rapidly and easily into conduction over the range of anode voltages used, typically from 100 volts to 500 volts (the range over which the main flash tube voltage changes during the flash). A tube constructed to meet these specifications was provided with a separation between main electrodes 44 of 0.5 cm. and was filled with xenon gas to a pressure of about 100 mm. Hg. The tube includes a trigger electrode 46 spaced midway between the two main electrodes 44. In order to accommodate the relatively high current necessary to effect the quench, the main electrodes were made of a doped sintered tungsten. The tube thus constructed was found to be quite satisfactory in operation.

A circuit constructed in accordance with the foregoing description operates as follows. The series circuit including the battery 16, the photocell 12, and the slidewire resistor 14 constitutes the initial detecting circuit for light reflected from the object to be photographed. The voltage signal appearing at the slider 18 is a function of the division of voltage across the resistance of the slidewire resistor 14 and the resistance of the photocell 12. This voltage will be stabilized at some value for various conditions of ambient or persistent light. Then, when the flash of light is reflected onto the photocell 12 from the object being photographed, the resistance of the photocell decreases rapidly following the incident flash of light. Since the decay time of the conductivity of the photocell 12 is slow relative to the flash interval, the photocell in and of itself effectively integrates the incident light, converting that incident light into a voltage signal of increasing magnitude appearing at the slider 18.

This signal of increasing magnitude is applied to the amplifier transistors 22 and 23, thence to the Zener diode 24. When this signal at the Zener diode 24 has reached a predetermined and fixed breakdown voltage, the Zener diode 24 becomes suddenly conductive and a voltage is developed across resistor 27 producing a sharp pulse of energy to the control electrode of a silicon control rectifier 26. The sharp pulse applied to the control electrode of the silicon control rectifier 26 causes that rectifier to become suddenly conductive, effectively short circuiting the resistor 32. This, in turn, causes the capacitor 36 to discharge, thereby applying a sharp pulse of energy to the primary winding of the trigger transformer 38. The transformer 38 transmits the triggering pulse through the capacitor 40 to the triggering electrode 46 of the quench tube 42. That triggering pulse cause the quench tube 42 to become instantaneously conductive. Since the quench tube 42 has a much lower impedance, when conductive, than does the main flash tube, almost all of the stored energy in the storage capacitor 6 is discharged through the quench tube 42, causing the main flash tube to be extinguished at such time as sufficient light has been reflected onto photocell 12 to effect the initiation of the quenching.

The slidewire 14 together with the slider 18 acting thereupon comprises means for adjusting the sensitivity of the system to correspond to the sensitivity of the various available films and the lens aperture on the camera. For convenience, the means for adjusting the slider 18 manually may be calibrated directly in terms of ASA film speed ratings and f/numbers.

Since the Zener diode 24 and the silicon controlled rectifier 26 are both of the so-called trigger type semi-conductors, it might seem that the use of both devices would be superfluous, and in some instances it might even be so. However, the triggering characteristics of the Zener diode are much more accurately controllable than are those of the silicon controlled rectifier. The silicon controlled rectifier is used as the main switch because of its power handling capabilities. The capacitor 40 in the triggering circuits of the quench tube is included to preclude the establishment of a discharge path in the trigger electrode circuit of the quench tube.

As was previously noted the decay time characteristic of the photocell is long with respect to the normal flash interval of the flash tube. On the other hand, however, for other considerations it is relatively short. It is this characteristic of the semiconductor photocells that enable them to be used in the present invention as a light integrator for the light from the flash tube. Further, because of this characteristic it is not necessary to provide shutter or switch means for exluding ambient light effects from the presence of the photocell. For ambient or persistent light conditions, the photocell does not continue to integrate but stabilizes at some value representative of the ambient light. Since the quench control circuit is capacity coupled throughout, the signal representative of the ambient light is not transmitted to the control electrode of the quench tube; only the pulse of energy representative of the integrated quantity of the light reflected from the flash is applied to the control circuit.

The light controlled rectifier 25 is effective to prevent the last transistor 23 from operating as an amplifier until the rectifier is triggered into a conducting state; i.e., a low impedance state. Thus, when the rectifier 25 is in a non-conducting state; i.e., a high impedance state, the emitter of transistor 23 is effectively disconnected from the positive side of battery 16. The rectifier 25 is arranged to be triggered by the light from the flash tube 2 so that when the desired signal from the photocell 12 is available, the transistor 23 is functioning as an amplifier. Thus, the rectifier 25 is effective to prevent extraneous electrical signals from being applied to the Zener diode 24 to cause false triggering of the rectifier 26. The rectifier 25 is turned off when the light from the flash tube 2 is terminated and the trigger circuit is disabled until the next supply of light energy from tube 2 triggers the rectifier 25 into a conducting state.

Thus it may be seen that there has been provided in accordance with the present invention an improved automatic flash exposure control apparatus for controlling the light energy produced by an electronic flash source which is characterized in that the time duration of the flash produced by the flash unit is automatically controlled in accordance with a desired program and the controlling operation is protected against false operation by extraneous signals.

Subject matter disclosed but not claimed herein is disclosed and claimed in the copending application of Roger D. Erickson, Ser. No. 393,310, filed on Aug. 31, 1964.

What is claimed is:

1. A light responsive control circuit comprising a light sensitive circuit means for producing, in response to an incident pulse of light energy, an electrical signal representing an integration of the light energy of said pulse, trigger circuit means connected to said light sensitive circuit means and responsive to said signal to produce a trigger pulse when said signal reaches a predetermined level, light sensitive gating means arranged to receive said pulse of light energy and interposed between said light sensitive circuit means and said trigger circuit means for permitting signals to pass to the latter means only when said gating means is illuminated, and switch circuit means connected to said trigger circuit means to receive said trigger pulse, and responsive to the latter to influence said pulse of light energy upon receiving said trigger pulse.

2. A light responsive control circuit as set forth in claim 1 wherein said gating means includes a signal amplifier for said signal and a photo sensitive silicon controlled rectifier arranged to disable said amplifier when said rectifier is in a non-conducting state and to allow said amplifier to pass said signal when said rectifier is in a conductive state.

3. A light responsive control circuit as set forth in claim 1 including a flash tube arranged to be made conductive to produce said pulse of light energy, and wherein said switch circuit means is connected in shunt with said flash tube and effectively short-circuits the latter to terminate the production of said pulse of light energy when said switch circuit means receives said trigger pulse.

4. In an electronic flash circuit wherein a stored electrical charge is selectively discharged through a flash tube, a flash control circuit comprising a light sensitive circuit means responsive to an incident pulse of light energy derived from said flash tube for producing an electrical signal representative of said pulse of light energy, said light sensitive means including a substantially non-reactive integrator means whereby said electrical signal represents an integration of said pulse of light energy, an electrical signal amplifying means connected to said light sensitive means and arranged to amplify said electrical signal to produce an amplifier output signal, a light sensitive silicon controlled rectifier connected between said amplifying means and a source of energizing power therefor, said rectifier being arranged to disable said amplifier when said rectifier is in a non-conducting state, means mounting said rectifier for exposure to said flash tube whereby said rectifier is triggered into a conducting state by the light energy from said flash tube, trigger circuit means connected to said amplifier circuit and responsive to said output signal to produce a trigger pulse upon a predetermined amplitude of said output signal, said trigger circuit including a Zener diode and a second silicon controlled rectifier arranged in cascade triggering relationship wherein said second rectifier is triggered into a conductive state by the change in electrical state of said Zener diode in response to said predetermined state of said output signal, switch circuit means including an electronic switch element adapted to be rendered conductive upon the application of a trigger pulse thereto, means connecting said trigger circuit means to said switch circuit means to control the operation thereof, and means for connecting said electronic switch element in shunt with said flash tube whereby to short-circuit said flash tube when said switch element becomes conductive.

*5. A light responsive control circuit comprising a light sensitive circuit means for producing, in response to an incident pulse of light energy of extremely short normal duration produced by a flash tube and reflected from an object to be photographed, an electrical signal representing an integration of the light energy of said pulse, trigger circuit means connected to said light senstive circuit means and responsive to said signal to produce a trigger pulse when said signal reaches a predetermined level, gating means arranged to be responsive to the occurrence of a change in an electrical signal resulting from the production of said pulse of light energy and connected to said light sensitive circuit means for permitting signals to reach said trigger circuit means only upon the occurrence of said electrical signal change, and switch circuit means connected to said trigger circuit means to receive said trigger pulse, and responsive to the latter to terminate said pulse of light energy prior to the expiration of said normal duration thereof upon receiving said trigger pulse.*

*6. A light responsive control circuit for controlling the duration of a pulse of light of extremely short normal duration produced by the firing of a flash tube to discharge electrical energy therethrough to illuminate an object to be photographed, comprising light sensitive means arranged to receive light as reflected from said object, circuit means including said light sensitive means and operative, when said light sensitive means has received a predetermined quantity of light, to actuate means to terminate said discharge and hence said pulse of light prior to the expiration of said normal duration thereof, and means responsive to the occurrence of a change in the electrical conductance of a portion of said circuit resulting from the firing of said flash tube and connected to said circuit means for preventing said operation of the latter in the absence of said change in said electrical conductance.*

*7. A light responsive control circuit for controlling the duration of a pulse of light of extremely short normal duration produced by the firing of a flash tube to discharge electrical energy therethrough to illuminate an object to be photographed, comprising gating means including means for producing a change in an electrical signal as a result of the firing of said flash tube, said gating means normally having a first state and arranged to be actuated into a temporary alternate state only upon the occurrence of said change in said signal, control means arranged, when actuated, to terminate said discharge and hence said pulse of light, light sensitive means arranged to receive light as reflected from said object, and circuit means including said light sensitive means and connected to said gating means and to said control means, said circuit means being operative, only when said gating means has its said alternate state, to actuate said control means when said light sensitive means has received a predetermined quantity of light, thereby to terminate said pulse of light prior to the expiration of said normal duration thereof.*

*8. An electronic photoflash apparatus comprising a flash tube, means for firing said flash tube to discharge electrical energy therethrough for producing a pulse of light which has an extremely short normal duration, said pulse of light being directed to illuminate an object to be photographed, gating means normally having a first state and arranged to be actuated into a temporary alternate state only upon the occurrence of a change in an electrical signal resulyting from the firing of said flash tube, control means arranged, when actuated, to terminate said discharge and hence said pulse of light, light sensitve means arranged to receive light as reflected from said object, and circuit means including said light sensitive means and connected to said gating means and to said control means, said circuit means being operative, only when said gating means has its said alternate state, to actuate said control means when said light sensitive means has received a predetermined quantity of light, thereby to terminate said pulse of light prior to the expiration of said normal duration thereof.*

References Cited

The following references, cited by the Examiner, are of record in the patented file of this patent or the original patent.

UNITED STATES PATENTS

| | | | |
|---|---|---|---|
| 2,622,229 | 12/1952 | Lord | 315—152 |
| 3,033,988 | 5/1962 | Edgerton | 250—205 |
| 3,122,677 | 2/1964 | Flieder | 315—241 |
| 3,156,827 | 11/1964 | Porteous et al. | 250—214 |
| 3,225,695 | 12/1965 | Kapp et al. | 307—305UX |

JOHN KOMINSKI, Primary Examiner

C. R. CAMPBELL, Assistant Examiner

U.S. Cl. X.R.

250—206, 214; 315—157, 241